(12) United States Patent
Balakrishnan et al.

(10) Patent No.: US 11,023,345 B1
(45) Date of Patent: Jun. 1, 2021

(54) SYSTEM AND APPARATUS FOR AUTOMATED EVALUATION OF COMPATIBILITY OF DATA STRUCTURES AND USER DEVICES BASED ON EXPLICIT USER FEEDBACK

(71) Applicant: Groupon, Inc., Chicago, IL (US)

(72) Inventors: Raju Balakrishnan, Santa Clara, CA (US); Vinay K. Deolalikar, Cupertino, CA (US); Matthew M. Heitz, Glen Allen, VA (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 16/047,409

(22) Filed: Jul. 27, 2018

Related U.S. Application Data (60) Provisional application No. 62/538,066, filed on Jul. 28, 2017.

(51) Int. Cl.
*G06F 11/30* (2006.01)
*G06Q 30/02* (2012.01)
(Continued)

(52) U.S. Cl.
CPC ...... *G06F 11/3051* (2013.01); *G06F 11/3003* (2013.01); *G06F 16/28* (2019.01); *G06Q 30/0251* (2013.01); *G06Q 30/0254* (2013.01); *H04L 41/0853* (2013.01); *H04L 41/0869* (2013.01)

(58) Field of Classification Search
None
See application file for complete search history.

(56) References Cited

U.S. PATENT DOCUMENTS 8,438,170 B2 * 5/2013 Koran ............... G06F 16/28
707/748
8,442,863 B2 * 5/2013 Chandramouli ... G06Q 30/0241
705/14.43
(Continued)

OTHER PUBLICATIONS

'Assignment#! Solutions' from University of Maryland, ENEE752: Knowledge Engineering, Fall 2009. (Year: 2009).*

*Primary Examiner* — Steven G Snyder
(74) *Attorney, Agent, or Firm* — Alston & Bird LLP (57) ABSTRACT

Embodiments are disclosed for automated evaluation of compatibility of a data structure with a user device. An example method includes receiving, by communications circuitry, a set of user device characteristics regarding the user device, and retrieving, by the personalization circuitry, a set of data structure characteristics regarding the data structure. The example method further includes calculating, by the personalization circuitry, a set of characteristic-level compatibility scores, and generating, by the personalization circuitry and based on the set of characteristic-level compatibility scores, a compatibility score for the data structure and the user device. Subsequently, the example method includes generating, by an aggregator and using the generated compatibility score, an indication of relative compatibility of the data structure for the user device, and causing transmission, by communications circuitry, of a control signal to the user device based on the indication of relative compatibility. Corresponding apparatuses and computer program products are also provided.

20 Claims, 4 Drawing Sheets

(51) Int. Cl.
*G06F 16/28* (2019.01)
*H04L 12/24* (2006.01)

(56) References Cited

U.S. PATENT DOCUMENTS

| | | | | |
|---|---|---|---|---|
| 8,572,647 B2* | 10/2013 | Liu | ......................... | G06Q 30/02 709/224 |
| 8,630,902 B2* | 1/2014 | Baum | .................... | G06Q 30/02 705/14.43 |
| 9,031,863 B2* | 5/2015 | Bagherjeiran | ......... | G06Q 30/02 705/14.49 |
| 9,105,048 B2* | 8/2015 | Koran | .................... | G06F 16/955 |
| 9,589,277 B2* | 3/2017 | Zhang | ................ | G06Q 30/0256 |
| 9,817,868 B2* | 11/2017 | Koran | .................... | G06F 16/212 |
| 10,296,546 B2* | 5/2019 | Chhaya | ............... | G06F 16/9535 |
| 10,321,203 B2* | 6/2019 | Kehler | ................ | G06Q 30/0254 |
| 2006/0020506 A1* | 1/2006 | Axe | ......................... | G06Q 30/02 705/14.43 |
| 2007/0239535 A1* | 10/2007 | Koran | .................... | G06F 16/212 705/14.25 |
| 2008/0243821 A1* | 10/2008 | Delli Santi | ........ | G06Q 30/0251 |
| 2009/0282014 A1* | 11/2009 | Gabrilovich | ........... | G06Q 30/02 |
| 2010/0242060 A1* | 9/2010 | Liu | ......................... | G06Q 30/02 725/9 |
| 2011/0313844 A1* | 12/2011 | Chandramouli | ... | G06Q 30/0241 705/14.42 |
| 2012/0226559 A1* | 9/2012 | Baum | .................... | G06Q 30/02 705/14.66 |
| 2012/0278162 A1* | 11/2012 | Sun | .................... | G06Q 30/0261 705/14.49 |
| 2013/0041750 A1* | 2/2013 | Ye | .......................... | G06Q 30/02 705/14.52 |
| 2013/0046619 A1* | 2/2013 | Translateur | ............ | G06Q 30/02 705/14.46 |
| 2013/0117083 A1* | 5/2013 | Gossett | .................. | G06Q 30/02 705/14.13 |
| 2013/0238429 A1* | 9/2013 | Koran | ................ | G06Q 30/0251 705/14.49 |
| 2013/0332274 A1* | 12/2013 | Faith | .................. | G06Q 30/0255 705/14.53 |
| 2014/0067544 A1* | 3/2014 | Klish | .................... | G06Q 30/02 705/14.66 |
| 2014/0337127 A1* | 11/2014 | Morel | ................ | G06Q 30/0251 705/14.49 |
| 2015/0186938 A1* | 7/2015 | Zhang | ................ | G06Q 30/0256 705/14.54 |
| 2015/0324430 A1* | 11/2015 | Koran | .................... | G06F 16/212 707/711 |
| 2016/0012485 A1* | 1/2016 | Dong | ................ | G06Q 30/0263 705/14.6 |
| 2016/0147758 A1* | 5/2016 | Chhaya | ............... | G06F 16/9535 707/733 |
| 2016/0253710 A1* | 9/2016 | Publicover | .............. | H04W 4/21 705/14.66 |
| 2016/0379250 A1* | 12/2016 | Bhalgat | .............. | G06Q 30/0255 705/14.53 |
| 2017/0053314 A1* | 2/2017 | Glover | ............... | G06Q 30/0267 |
| 2017/0061481 A1* | 3/2017 | Wee | ................... | G06Q 30/0254 |
| 2017/0140436 A1* | 5/2017 | Zheng | ..................... | G06Q 30/02 |
| 2017/0186029 A1* | 6/2017 | Morris | ............... | G06Q 30/0243 |
| 2017/0214589 A1* | 7/2017 | Conover | ............ | G06F 16/9024 |
| 2017/0332150 A1* | 11/2017 | Kehler | ............... | G06Q 30/0254 |
| 2017/0359273 A1* | 12/2017 | Dubey | ................ | H04L 67/1021 |
| 2017/0364948 A1* | 12/2017 | Datta | ................ | G06Q 30/0255 |
| 2018/0158100 A1* | 6/2018 | Barak | ................ | G06Q 30/0255 |

\* cited by examiner

SYSTEM AND APPARATUS FOR AUTOMATED EVALUATION OF COMPATIBILITY OF DATA STRUCTURES AND USER DEVICES BASED ON EXPLICIT USER FEEDBACK

CROSS-REFERENCE TO RELATED APPLICATIONS

This application claims the benefit of U.S. Provisional Patent Application No. 62/538,066, filed Jul. 28, 2017, the entire contents of which are incorporated herein by reference.

TECHNOLOGICAL FIELD

Example embodiments of the present invention relate generally to compatibility of data structures with particular user devices and, more particularly, to a system and method for utilizing characteristics of data structures and user devices to enhance the fidelity of compatibility determinations.

BACKGROUND

The inventors have discovered problems with existing mechanisms for identifying the compatibility of data structures for particular user devices. Through applied effort, ingenuity, and innovation, the inventors has solved many of these identified problems by developing solutions embodied by the present invention and described in detail below.

BRIEF SUMMARY

The determination of compatibility between two things is a fundamental requirement applicable to a wide range of technical disciplines. A mechanic must determine whether a particular part is compatible with a particular vehicle. A chef must determine whether a particular spice enhances the flavor of a particular dish. And a software provider must determine which applications enhance the experience of which user devices. Determining compatibility between two discrete items is, traditionally, a task best suited to human resolution. However, in many domains, the number of determinations that may be made, and the scale at which those determinations must be made, creates intractable problems for human compatibility determinations. Accordingly many in various industries have attempted to automate compatibility decision-making.

Methods, apparatuses, and systems are described herein that provide improved capability for making automated compatibility determinations. In this regard, example embodiments utilize constituent characteristic comparisons to determine compatibility between user devices and particular data structures. In some embodiments, example embodiments rely upon a modified jaccard similarity scoring system that automates the compatibility determination function in a rigorous and effective manner. In turn, example embodiment facilitate individually tailored recommendations of data structures for selection by specific user devices, and facilitate provision of such recommendations at a larger scale than could has ever historically been possible.

In a first example embodiment, an apparatus is provided for automated evaluating compatibility of a data structure with a user device. The apparatus includes communications circuitry configured to receive a set of user device characteristics regarding the user device, and personalization circuitry configured to retrieve a set of data structure characteristics regarding the data structure, calculate a set of characteristic-level compatibility scores, and generate, based on the set of characteristic-level compatibility scores, a compatibility score for the data structure and the user device. The apparatus further includes an aggregator configured to generate, using the generated compatibility score, an indication of relative compatibility of the data structure for the user device, wherein the communications circuitry is further configured to cause transmission of a control signal to the user device based on the indication of relative compatibility.

In some embodiments, the personalization circuitry is configured to calculate the set of characteristic-level compatibility scores by calculating a characteristic-level compatibility score for each combination pair of one user device characteristic from the set of user device characteristics and one data structure characteristic from the set of data structure characteristics.

In some embodiments, the personalization circuitry is configured to calculate each particular characteristic-level compatibility score by calculating a modified jaccard similarity score using a particular user device characteristic and a particular data structure characteristic. In this regard, the personalization circuitry may be further configured to calculate each particular characteristic-level compatibility score by applying a normalization algorithm to the calculated modified jaccard similarity score.

In some embodiments, the personalization circuitry is configured to calculate the set of characteristic-level compatibility scores in a batch process.

In some embodiments, the personalization circuitry is configured to calculate the set of characteristic-level compatibility scores periodically.

In some embodiments, the personalization circuitry is configured to generate the compatibility score based only on those characteristic-level compatibility scores calculated for combinations of one user device characteristic from the set of user device characteristics and one data structure characteristics from the set of data structure characteristics.

In some embodiments, the personalization circuitry is configured to generate the compatibility score based on the set of characteristic-level compatibility score by determining a largest characteristic-level compatibility score of the set of characteristic-level compatibility scores, and generating the compatibility score with a value equal to the largest characteristic-level compatibility score.

In some embodiments, the personalization circuitry is configured to generate the compatibility score based on the set of characteristic-level compatibility score by determining an average of the set of characteristic-level compatibility scores, and generating the compatibility score with a value equal to the average of the set of characteristic-level compatibility scores.

In some embodiments, the aggregator is configured to generate the indication of relative compatibility of the data structure for the user device by compiling a compatibility set comprising both the generated compatibility score for the data structure and the user device as well as one or more additional compatibility scores for the user device and corresponding additional data structures, and ordering the compatibility set by compatibility score value, wherein ordered compatibility set (1) comprises the indication of relative compatibility of the data structure for the user device, and (2) indicates a ranking of the generated compatibility score for the data structure and the user device within the compatibility set. In some such embodiments, the control signal identifies a selection set containing a predetermined number of data structures having a greatest indication of relative compatibility for the user device.

In some embodiments, the communications circuitry is configured to receive, in response to transmission of the control signal, an indication of a data structure selected from the selection set.

In another example embodiment, a method is provided for automated evaluating compatibility of a data structure with a user device. The method includes receiving, by communications circuitry, a set of user device characteristics regarding the user device, retrieving, by personalization circuitry, a set of data structure characteristics regarding the data structure, calculating, by the personalization circuitry, a set of characteristic-level compatibility scores, generating, by the personalization circuitry and based on the set of characteristic-level compatibility scores, a compatibility score for the data structure and the user device, generating, by an aggregator and using the generated compatibility score, an indication of relative compatibility of the data structure for the user device, and causing, by communications circuitry, transmission of a control signal to the user device based on the indication of relative compatibility.

In some embodiments, calculating the set of characteristic-level compatibility scores includes calculating a characteristic-level compatibility score for each combination pair of one user device characteristic from the set of user device characteristics and one data structure characteristic from the set of data structure characteristics.

In some embodiments, calculating each particular characteristic-level compatibility score includes calculating, by the personalization circuitry, a modified jaccard similarity score using a particular user device characteristic and a particular data structure characteristic. In this regard, calculating each particular characteristic-level compatibility score may include applying, by the personalization circuitry, a normalization algorithm to the calculated modified jaccard similarity score.

In some embodiments, calculating the set of characteristic-level compatibility scores includes calculating, by the personalization circuitry, the set of characteristic-level compatibility scores in a batch process.

In some embodiments, calculating the set of characteristic-level compatibility scores includes calculating, by the personalization circuitry, the set of characteristic-level compatibility scores periodically.

In some embodiments, generating the compatibility score comprises generating the compatibility score based only on those characteristic-level compatibility scores calculated for combinations of one user device characteristic from the set of user device characteristics and one data structure characteristics from the set of data structure characteristics.

In some embodiments, generating the compatibility score based on the set of characteristic-level compatibility score comprises determining, by the personalization circuitry, a largest characteristic-level compatibility score of the set of characteristic-level compatibility scores, and generating, by the personalization circuitry, the compatibility score with a value equal to the largest characteristic-level compatibility score.

In some embodiments, generating the compatibility score based on the set of characteristic-level compatibility score comprises determining, by the personalization circuitry, an average of the set of characteristic-level compatibility scores, and generating, by the personalization circuitry, the compatibility score with a value equal to the average of the set of characteristic-level compatibility scores.

In some embodiments, generating the indication of relative compatibility of the data structure for the user device includes compiling, by the aggregator, a compatibility set comprising both the generated compatibility score for the data structure and the user device as well as one or more additional compatibility scores for the user device and corresponding additional data structures, and ordering, by the aggregator, the compatibility set by compatibility score value, wherein ordered compatibility set (1) comprises the indication of relative compatibility of the data structure for the user device, and (2) indicates a ranking of the generated compatibility score for the data structure and the user device within the compatibility set. In some such embodiments, the control signal identifies a selection set containing a predetermined number of data structures having a greatest indication of relative compatibility for the user device.

In some embodiments, the method further includes receiving, by the communications circuitry and in response to transmission of the control signal, an indication of a data structure selected from the selection set.

In another example embodiment, a computer program product is provided for automated evaluating compatibility of a data structure with a user device. The computer program product includes at least one non-transitory computer-readable storage medium storing program instructions that, when executed, cause an apparatus to: receive a set of user device characteristics regarding the user device; retrieve a set of data structure characteristics regarding the data structure; calculate a set of characteristic-level compatibility scores; generate, based on the set of characteristic-level compatibility scores, a compatibility score for the data structure and the user device; generate, using the generated compatibility score, an indication of relative compatibility of the data structure for the user device; and cause transmission of a control signal to the user device based on the indication of relative compatibility.

In some embodiments, the program instructions, when executed, cause the apparatus to calculate the set of characteristic-level compatibility scores by causing the apparatus to calculate a characteristic-level compatibility score for each combination pair of one user device characteristic from the set of user device characteristics and one data structure characteristic from the set of data structure characteristics.

In some embodiments, the program instructions, when executed, cause the apparatus to calculate each particular characteristic-level compatibility score by causing the apparatus to calculate a modified jaccard similarity score using a particular user device characteristic and a particular data structure characteristic. In this regard, calculating each particular characteristic-level compatibility score may include applying a normalization algorithm to the calculated modified jaccard similarity score.

In some embodiments, the program instructions, when executed, cause the apparatus to calculate the set of characteristic-level compatibility scores in a batch process.

In some embodiments, the program instructions, when executed, cause the apparatus to calculate the set of characteristic-level compatibility scores periodically.

In some embodiments, the program instructions, when executed, cause the apparatus to generate the compatibility score comprises based only on those characteristic-level compatibility scores calculated for combinations of one user device characteristic from the set of user device characteristics and one data structure characteristics from the set of data structure characteristics.

In some embodiments, the program instructions, when executed, cause the apparatus to generate the compatibility score based on the set of characteristic-level compatibility score by causing the apparatus to determine a largest characteristic-level compatibility score of the set of characteristic-level compatibility scores, and generate the compatibility score with a value equal to the largest characteristic-level compatibility score.

In some embodiments, the program instructions, when executed, cause the apparatus to generate the compatibility score based on the set of characteristic-level compatibility score by causing the apparatus to determine an average of the set of characteristic-level compatibility scores, and generate the compatibility score with a value equal to the average of the set of characteristic-level compatibility scores.

In some embodiments, the program instructions, when executed, cause the apparatus to generate the indication of relative compatibility of the data structure for the user device by causing the apparatus to compile a compatibility set comprising both the generated compatibility score for the data structure and the user device as well as one or more additional compatibility scores for the user device and corresponding additional data structures, and order the compatibility set by compatibility score value, wherein ordered compatibility set (1) comprises the indication of relative compatibility of the data structure for the user device, and (2) indicates a ranking of the generated compatibility score for the data structure and the user device within the compatibility set. In some such embodiments, the control signal identifies a selection set containing a predetermined number of data structures having a greatest indication of relative compatibility for the user device.

In some embodiments, the program instructions, when executed, further cause the apparatus to receive, in response to transmission of the control signal, an indication of a data structure selected from the selection set.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, and systems are described herein that provide improved capability for making automated compatibility determinations. In this regard, example embodiments utilize constituent characteristic comparisons to determine compatibility between user devices and particular data structures based on explicit feedback from user devices. In some embodiments, example embodiments rely upon a modified jaccard similarity scoring system that automates the compatibility determination function in a rigorous and effective manner. In turn, example embodiment facilitate individually tailored recommendations of data structures for selection by specific user devices, and facilitate provision of such recommendations at a larger scale than could has ever historically been possible.

Figure 1:
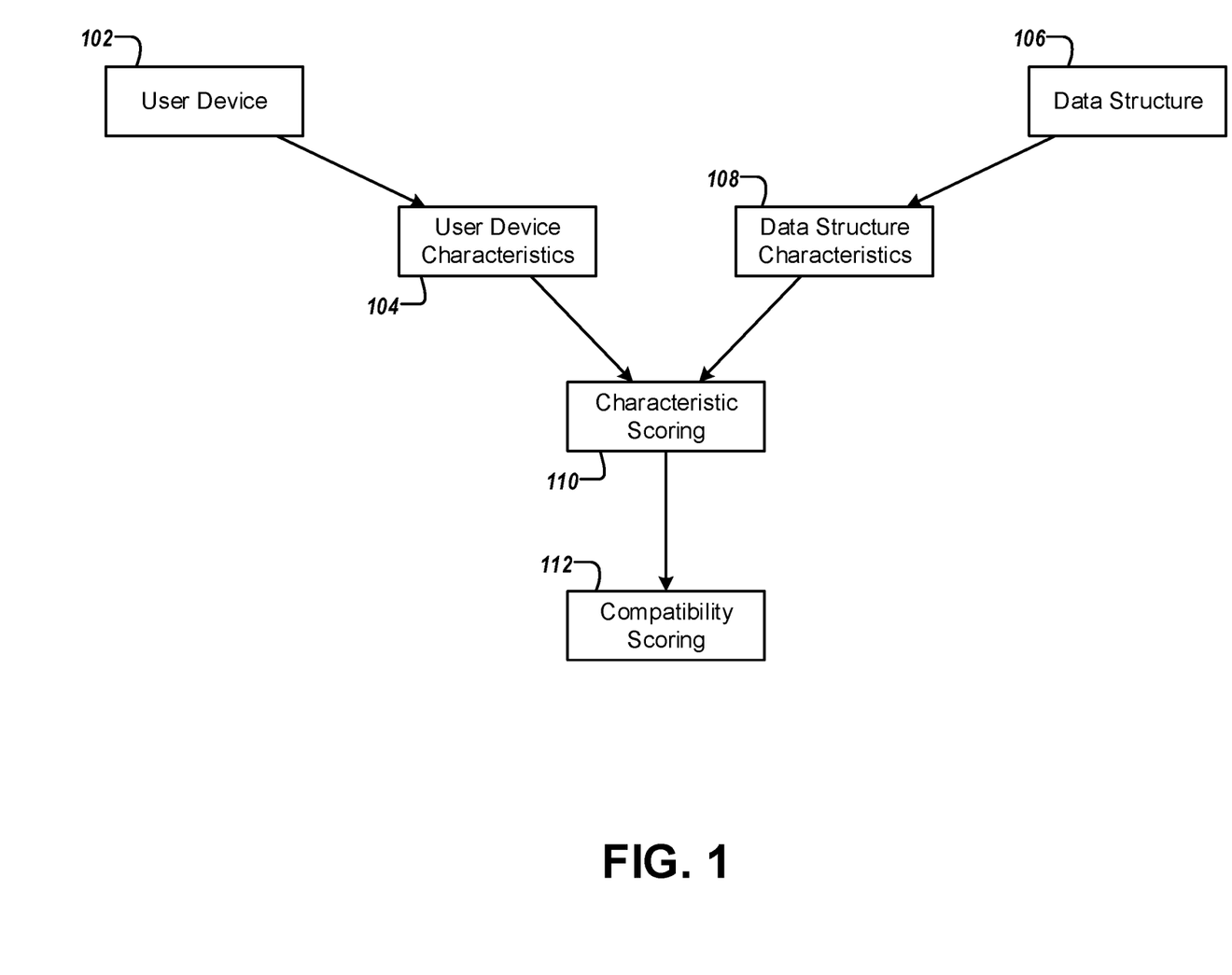
FIG. 1 shows a high-level data flow diagram for evaluating compatibility of a data structure with a user device.

Turning to FIG. 1, a high level data flow diagram is provided that outlines the underlying process for evaluating the compatibility of a particular data structure for a particular user device. First, the particular user device 102 is received by a compatibility determination system, and from that user device 102, the compatibility determination system retrieves a set of user device characteristics 104 associated with the user device 102. In parallel or in sequence, the compatibility determination system receives the data structure 106, and retrieves a set of data structure characteristics 108 associated with the data structure 106. As shown at element 110 of FIG. 1, from the set of user device characteristics 104 and the set of data structure characteristics 108, the compatibility determination system scores pairs of individual user device characteristics and data structure characteristics. Given the results of the pair-wise scoring of the user device characteristics and the data structure characteristics, the compatibility determination system subsequently performs a compatibility scoring function 112 to generate a compatibility score of the particular user device 102 and the particular data structure 106. While described in connection with a particular user device 12 and a particular data structure 106, it will be understood that this high-level procedure can be applied in parallel to many different combinations of user devices and data structures, thus facilitating an identification of which data structures are most compatible with which user devices. This information, in turn, may then be used to present data structures for selection by user devices, wherein the presented data structures are likely of particular relevance to the user devices.

Greater detail is provided below regarding example embodiments that implement this high-level procedure.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "user device characteristic" refers to electronic information associated or "tagged" to a user device by a compatibility determination system in support of improved interaction with the compatibility determination system. Upon registering with the compatibility determination system or at any time thereafter, the user device may be invited to provide information that aids the compatibility determination system in identifying data structures and/or other products that compatible with the particular needs of the user or user device. Moreover, the user device characteristics, while imputed to a given user device, may also relate to a particular user who has logged into the user device. Accordingly, a set of user device characteristics may be informed both by physical features, capabilities, and qualities of the user device itself, the set of user device characteristics may also be informed by the interests, hobbies, age, gender, and/or other specific information regarding the user logged into or otherwise associated at some given point in time with the user device. The pieces of information comprising user device characteristics may be retrieved from a user when that user creates a new account, may be retrieved based on clickstream or contextual data regarding the user and/or user device, or may be based on the physical features, capabilities, and qualities of the user device itself. Altogether, these discrete pieces of information may be stored as user device characteristics of the user and/or his user device.

As used herein, the term "data structure characteristic" refers to electronic information associated or "tagged" to a particular data structure by a compatibility determination system in support of improved determination, by the compatibility determination system, of compatibility between the particular data structure and one or more user devices. Upon registering with the compatibility determination system or at any time thereafter, a developer device may be invited to provide information that aids the compatibility determination system in selecting a set of data structure characteristics to associate with the particular data structure. For example, a developer may, via his developer device, provide a series of interests, hobbies, his age, genders, and/or locations relevant to a particular data structure, and these discrete pieces of information may be stored as user device characteristics of the user and/or his user device. In instances where the data structure identifies a particular merchant, or a particular product or service, the data structure characteristics may thus be associated with the particular merchant, product, or service.

It should be appreciated that user device characteristics and data structure characteristics refer to information voluntarily and explicitly provided to the compatibility determination system, such as by completing a form or survey on a website or application hosted by the compatibility determination system. However, is should also be appreciated that user device characteristics and data structure characteristics may also be identified implicitly or through review or analysis of other information available to the compatibility determination system, such as historical records and clickstream data retrieved from interactions by user devices and/or data structure developer devices with the compatibility determination system. It should also be appreciated that the compatibility determination system may also gate access to certain features or tools based on whether certain characteristics have been provided. For example, the user device and/or developer device may be required to provide corresponding characteristics during a registration process.

As used herein, the term "clickstream data" refers to electronic information indicating content viewed, accessed, edited, or retrieved via one or more user devices. This information may be electronically processed and analyzed to identify user device characteristics to be associated (or "tagged") to a particular user device, and as a result that improve the quality and relevance of information provided by a data structure developer or compatibility determination system to the one or more user devices. It should be understood that the term "clickstream" is not intended to be limited to mouse clicks. For example, the clickstream data may include various other consumer interactions, including without limitation, mouse-over events and durations, the amount of time spent by the user device "viewing" particular content, the rate at which provision of particular content result in selection of that content, demographic information associated with each particular user associated with the user device, data indicating other content accessed by the user and/or user device (e.g., browser cookie data), the time or date on which content was accessed, the frequency with which particular content is accessed, associations between particular users and/or user devices, and/or the like.

As used herein, the term "contextual information" refers to electronic information providing information regarding the physical context of a particular device. Contextual information may be associated with a consumer or a merchant location, or any other entity capable of interaction with the consumer. For example, in some embodiments, contextual information includes location data provided by a location services module of the particular device. In addition to location data, however, contextual information may include velocity or acceleration data, gyroscopic data, data regarding a direction-of-travel, calculated data regarding the mode of travel (e.g., walking, jogging, biking, vehicular movement, or the like) of the particular device. Contextual information may also comprise sensor readings regarding ambient environmental conditions of the particular device (e.g., temperature, humidity, brightness, orientation, proximity, or the like) and may further comprise interpretations of audio data captured by a microphone. Contextual information may also include data regarding the proximity of other devices to the particular device, which can be calculated based on signals transmitted between the particular device and the other devices. Moreover, contextual information may include environmental indicators, such as the time of the day, day of the week, seasons, country identification, or the like. Moreover, contextual information may also include historical information stored by the device or retrieved from another device. Accordingly, contextual information may be retrieved by the compatibility determination system and used in conjunction with clickstream data to identify user device characteristics to associate or tag to a particular user device. It should be appreciated that contextual information may be provided by various systems and sensors provided by particular user devices, by particular devices under control of the particular user devices, received from other devices, received from local or external databases, or received from a user via a user interface.

As used herein, the term "compatibility score" is a numerical value indicating the compatibility of a particular data structure for a particular user device. As described in greater detail below, each compatibility score is based on a set of characteristic-level compatibility scores relevant to the user device and the data structure. In this regard, the compatibility score of a particular data structure with a particular user device provides insight into the relevance between the particular user device and the particular data structure. As one example, the numerical value of the characteristic-level compatibility score of the data structure characteristic "camera" with the user device characteristic "photography" may be higher than the numerical value of the characteristic-level compatibility score of the data structure characteristic "camera" with the user device characteristic "painting." Example apparatuses and corresponding methods for generating characteristic-level compatibility scores are described in greater detail below. Example apparatuses and corresponding methods for generating compatibility scores are described in greater detail below.

As used herein, the term "characteristic-level compatibility score" is a numerical value indicating the compatibility of a particular data structure characteristic with a particular user device characteristic. In this regard, the characteristic-level compatibility score of a particular data structure characteristic with a particular user device characteristic provides insight into the relevance between user devices having the particular user device characteristic and data structures having the particular data structure characteristic. As one example, the numerical value of the characteristic-level compatibility score of the data structure characteristic "camera" with the user device characteristic "photography" may be higher than the numerical value of the characteristic-level compatibility score of the data structure characteristic "camera" with the user device characteristic "painting." Example apparatuses and corresponding methods for generating characteristic-level compatibility scores are described in greater detail below.

As used herein, the term "modified jaccard similarity score" refers to one example procedure for calculating a characteristic-level compatibility score created by the inventors through a modification of the jaccard index. In this regard, a modified jaccard similarity score $s_{ij}$ can be calculated as follows:

$$s_{ij} = \frac{p_{ij}}{\|p_i\|\|p_j\|}, \quad (1)$$

where $s_{ij}$ is the characteristic-level compatibility score between a particular user device characteristic i and a particular data structure characteristic j, $p_{ij}$ represents is the number of user devices with user device characteristic i who have selected data structures having data structure characteristic j in a given time period, $p_i$ represents the total number of known user devices with user device characteristic i in the time period; and $p_j$ stands for the total number of user devices that selected data structures with data structure characteristic j for the time period. $\|p\|$ stands for a norm of p. This norm may in some embodiments comprise a "two norm" (e.g., the square root of the sum of the squares of the individual elements comprising p), although in other embodiments the norm may comprise a "one norm" (e.g., the sum of the magnitudes of the individual elements) may be used instead of a two norm.

As used herein, the term "normalization" refers to a procedure for adjusting values within a data set. In turn, the term "normalization procedure," as used herein, refers to a procedure for adjusting values within a set to increase the predictive value of the set. In some embodiments, a normalization procedure compensates for the overall propensity of a user devise to act on any data structure (purchase/click, etc.) and the overall tendency of a data structure to be acted upon by any user device in general. In some example embodiments, the normalization procedure may comprise the following:

$$s_{u_j} = \sum_{i=1}^{n} s_{ji}, \quad (2)$$

$$s_{d_i} = \sum_{j=1}^{m} s_{ji}, \quad (3)$$

$$s'_{ij} = \frac{1 + s_{ij}}{(s_{d_i} + k_1 \ln(s_{u_j}) + k_2)(s_{u_j} + 1)}, \quad (4)$$

where $k_1$ and $k_2$ are constants, $s'_{ij}$ is the calculated characteristic-level compatibility score for user characteristic i and data structure characteristic j, $s_{u_j}$ is the sum total of characteristic-level compatibility scores between a particular user device $u_j$ and a set of n data structure characteristics, and $s_{d_i}$ is the sum total of characteristic-level compatibility scores between a particular data structure $d_i$ and a set of m user device characteristics.

Having set forth a series of definitions called-upon throughout this application, an example system architecture is described below for implementing example embodiments of the present invention.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more user devices or one or more developer devices. Example embodiments of the user and developer devices include any of a variety of mobile terminals, such as a portable digital assistant (PDA), mobile telephone, smartphone, laptop computer, tablet computer, or any combination of the aforementioned devices.

Figure 2:
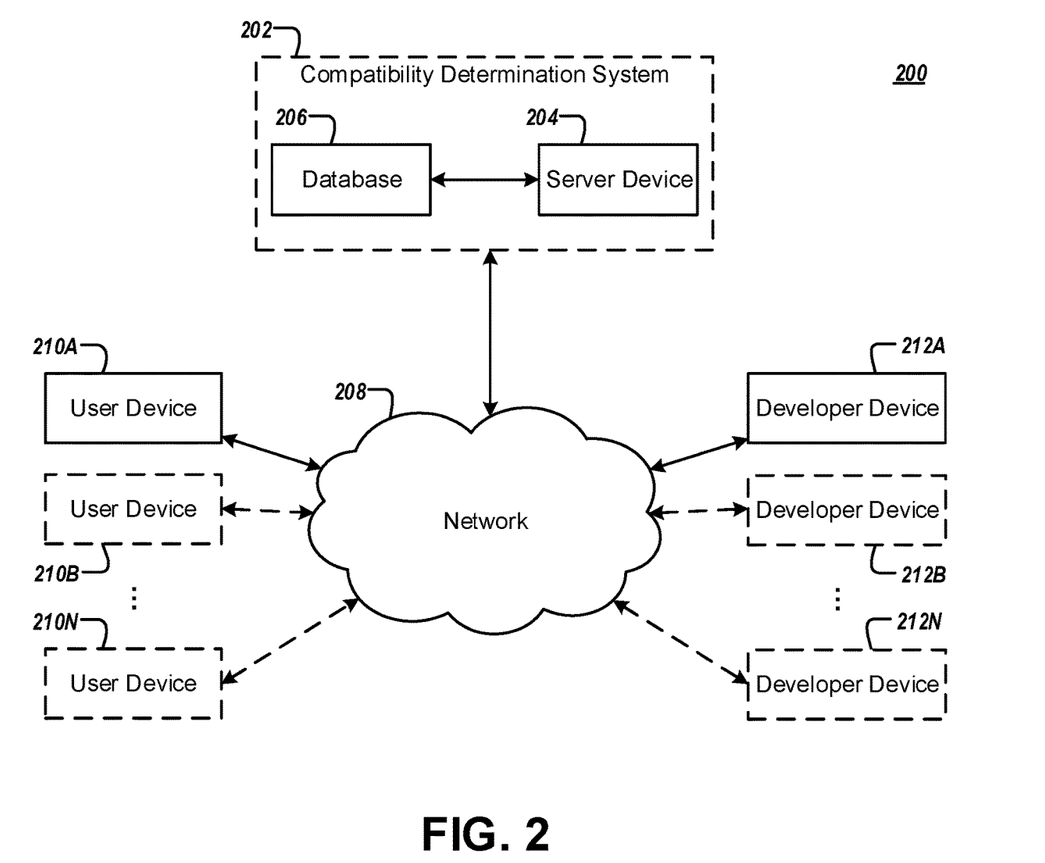
FIG. 2 illustrates a system diagram illustrating various devices that may interact in some example embodiments.

In this regard, FIG. 2 discloses an example computing system 200 within which embodiments of the present invention may operate. As illustrated, a compatibility determination system 202 may be connected to user devices 210A-210N and developer devices 212A-212N may interact with the consumer device 110. The compatibility determination system 202 may comprise a server device 204 in communication with a database 206.

The compatibility determination system 202 may be embodied as a computer or computers as known in the art. The compatibility determination system 202 may provide for receiving of user device characteristics and data structure from various sources, including but not necessarily limited to the user devices 210A-210N and developer devices 212A-212N. For example, the compatibility determination system 202 may be operable to receive and process clickstream data or contextual information provided by the compatibility determination system 202 and/or other devices. The compatibility determination system 202 may evaluate the compatibility of particular user devices 210 and particular data structures, and may also facilitate recommendation of data structures to particular user devices 210 based on the results of such compatibility determinations.

The database 206 may be embodied as a data storage device such as a Network Attached Storage (NAS) device or devices, or as a separate database server or servers. The database 206 includes information accessed and stored by the compatibility determination system 202 to facilitate the operations of the compatibility determination system 202. For example, the database 206 may store user account credentials for users of user devices 210A-210N, or developers of developer devices 212A-212N, data regarding user device characteristics of various user devices 210A-210N and data structure characteristics of various data structures, clickstream data, contextual information, historical information regarding user devices that have selected particular data structures in the past, or the like.

The user devices 210A-210B and developer devices 212A-212N may be embodied by any computing device known in the art. Information received by the compatibility determination system 202 from these devices may be provided in various forms and via various methods. For example, the user devices 210A-210N and developer devices 212A-212N may be laptop computers, smartphones, netbooks, tablet computers, wearable devices, or the like, and the information may be provided through various modes of data transmission provided by these consumer devices.

In embodiments where a user device 210 or developer device 212 is a mobile device, such as a smart phone or tablet, the mobile device may execute an "app" to interact with the compatibility determination system 202. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

In the case of a user device 210, the compatibility determination system 202 may leverage the application framework offered by the mobile operating system to allow users to designate which information is harvested by the app and which may then be provided to the compatibility determination system 202. In some embodiments, consumers may "opt in" to provide particular types of contextual data in exchange for a benefit. In some embodiments, the user may be provided with privacy information and other terms and conditions related to the electronic marketing information harvested by the user device 210 and provided to the compatibility determination system 202 during installation or use of the app. Once the user provides access to a particular feature of the user device 210, information derived from that feature may in some embodiments be provided to the compatibility determination system 202 to improve the quality of the compatibility determinations provided by the compatibility determination system 202.

For example, the user may indicate a desire to provide location information to the app from location services circuitry included in their mobile device. Providing this information to the compatibility determination system 202 may enable the compatibility determination system 202 to identify additional user device characteristics that are relevant to the particular user device, thereby improving the relevance of compatibility determinations generated by the compatibility determination system 202. It should be appreciated that the various mobile device operating systems may provide the ability to regulate the information provided to the app associated with the compatibility determination system 202. For example, the user may decide at a later point to disable the ability of the app to access the location services circuitry, thus limiting the access of the user device's location information to the compatibility determination system 202.

Various other types of information may also be provided in conjunction with an app executing on the user device 210. For example, if the user device 210 includes a social networking feature, the user may enable the app to provide updates to the user's social network to notify friends of a particularly interesting data structure. It should be appreciated that the use of mobile technology and associated app frameworks may provide for particularly unique and beneficial uses of the compatibility determination system 202 through leveraging the functionality offered by the various mobile operating systems.

Additionally or alternatively, the user device 210 or developer device 210 may interact with the compatibility determination system 202. As yet another example, the user device 210 may include various hardware or firmware designed to interface with the compatibility determination system 202, (e.g., where the user device 210 is a purpose-built device such as a kiosk offered for the primary purpose of communicating with the compatibility determination system 202).

The developer devices 212A-212N may be any computing devices known in the art and operated by a developer. For example, the developer devices 212A-212N may be smartphones, PDAs, or desktop computers configured to access a web page via a browser using a set of developer account credentials).

As a foundation for some embodiments, the application may prompt the user devices 210A-210N and/or developer devices 212A-212N to provide characteristic identifications, and may collect clickstream data and/or contextual information to facilitate the automatic evaluation of compatibility of particular data structures with particular user devices.

Example Implementing Apparatus

Figure 3:
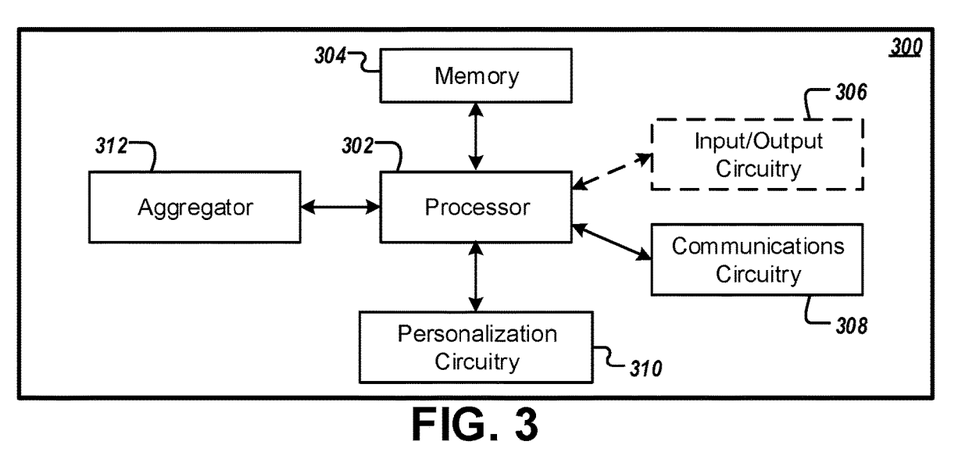
FIG. 3 illustrates a schematic block diagram of example circuitry embodying a compatibility determination system that may perform operations in accordance with some example embodiments described herein.

The compatibility determination system 202 may be embodied by one or more computing systems, such as apparatus 300 shown in FIG. 3. As illustrated in FIG. 3, the apparatus 300 may include a processor 302, a memory 304, input/output circuitry 306, communications circuitry 308, personalization circuitry 310, and aggregator 312. The apparatus 300 may be configured to execute the operations described above with respect to FIG. 1 and below with respect to FIG. 4. Although these components 302-312 are described with respect to functional limitations, it should be understood that the particular implementations necessarily include the use of particular hardware. It should also be understood that certain of these components 302-312 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus therefore includes particular hardware configured to perform the functions associated with the particular circuitry described herein.

Of course, while the term "circuitry" should be understood broadly to include hardware, in some embodiments, circuitry may also include software for configuring the hardware. For example, in some embodiments, "circuitry" may include processing circuitry, storage media, network interfaces, input/output devices, and the like. In some embodiments, other elements of the apparatus 300 may provide or supplement the functionality of particular circuitry. For example, the processor 302 may provide processing functionality, the memory 304 may provide storage functionality, the communications circuitry 308 may provide network interface functionality, and the like.

In some embodiments, the processor 302 (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus to carry out various functions in accordance with example embodiments of the present invention.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display that may include a web user interface, a mobile application, a client device, or the like. In some embodiments, the input/output circuitry 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the apparatus 300 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Personalization circuitry 210 includes hardware components designed to generate compatibility scores for a particular user device and a particular data structure. These hardware components may, for instance, utilize communications circuitry 308 to receive signals and contextual data from remote devices (e.g., user devices 210A-210N, developer devices 212A-212N, compatibility determination system 202, or the like). Personalization circuitry 210 may utilize processing circuitry, such as the processor 302, to perform the above operations, and may utilize memory 304 to store the collected contextual information. It should also be appreciated that, in some embodiments, the personalization circuitry 210 may include a separate processor, specially configured field programmable gate array (FPGA), or application specific interface circuit (ASIC) to perform the above functions.

Aggregator 212 includes hardware components designed to automatically generate an indication of the relative compatibility of a given data structure for a particular user device. These hardware components may, for instance, utilize processor 302, memory 304, and communications circuitry 308 to process and retrieve data, and to receive signals and variable element values from remote devices (e.g., database 206). Aggregator 212 may utilize processing circuitry, such as the processor 302, to perform the above operations, and may utilize memory 304 to store the collected contextual information. It should also be appreciated that, in some embodiments, the aggregator 212 may include a separate processor, specially configured field programmable gate array (FPGA), or application specific interface circuit (ASIC) to perform the above functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as systems, methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

The user device(s) 210A-210N and developer devices 212A-212N may be embodied by one or more computing systems that also may include a processor, a memory, an input/output circuitry, and a communications circuitry. As it relates to operations described in the present invention, the functioning of these components may be similar to the similarly named components described above with respect to FIG. 3, and for the sake of brevity, additional description of the mechanics of these components is omitted. Nevertheless, these device elements, operating together, provide the respective apparatuses with the functionality necessary to facilitate the communication of data (e.g., electronic marketing information, business analytic data, or the like) with the compatibility determination system.

Having described specific components of example devices involved in the present invention, an example procedure for automatically evaluating compatibility of a data structure with a user device is described below in connection with FIGS. 4 and 5.

Example Operations for Determination Compatibility

Figure 4:
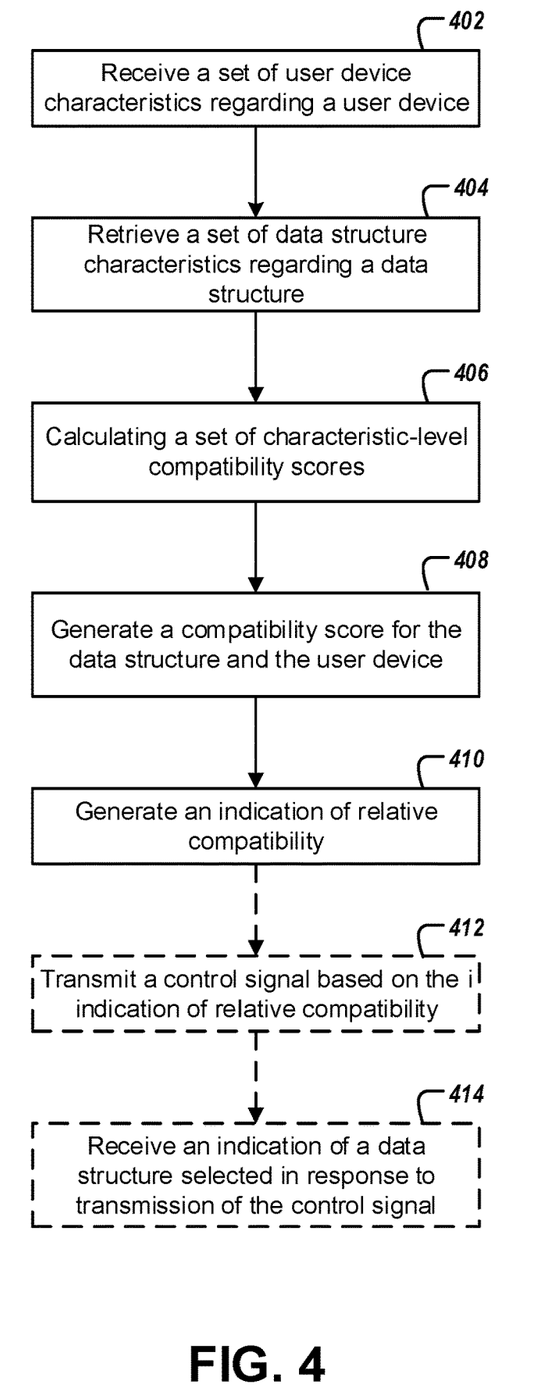
FIG. 4 illustrates a flowchart describing example operations performed by a compatibility determination system to evaluate compatibility of a data structure with a user device, in accordance with some example embodiments described herein.
Figure 5:
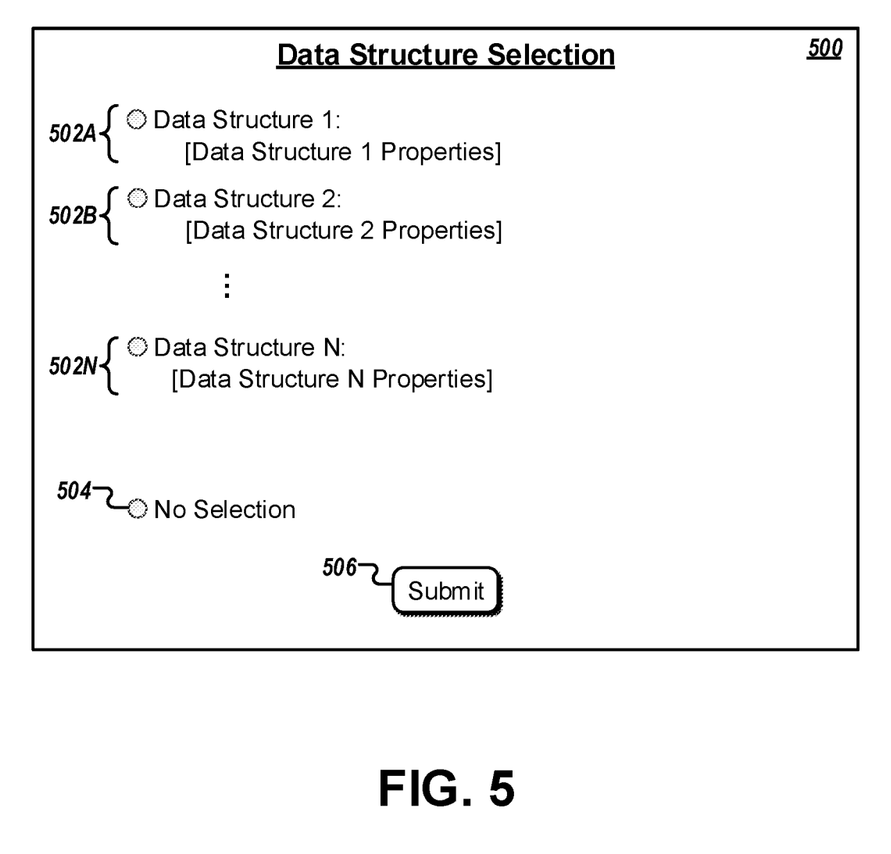
FIG. 5 illustrate example user interface for presentation of data structures for user selection, in accordance with some example embodiments.

Turning to FIG. 4, a flowchart is illustrated that contain operations for automatically evaluating compatibility of a data structure with a user device. The operations illustrated in FIG. 4 may, for example, be performed by a compatibility determination system 202 hosting comprising a server device 204 that is or is under the control of an apparatus 300. The various operations described in connection with FIG. 4 may thus be performed by the apparatus 300 by or through the use of one or more of processor 302, memory 304, communications circuitry 306, input/output circuitry 308, personalization circuitry 310, and/or aggregator 312. The operations described in connection with FIG. 4 are discussed for a particular user device and a particular data structure. It will be understood, however, that these operations may be applied for any combination of user device and data structure desired, and in fact may be performed for every combination of user device and data structure, to thereby identify, by a compatibility determination system 202, which user devices are most compatibility with which data structures on a global basis.

In any event, turning first to operation 402, the apparatus 300 includes means, such as communications circuitry 306 or the like, for receiving a set of user device characteristics regarding the user device. As noted previously, the set of user device characteristics comprises electronic information associated or "tagged" to the user device, either previously by the apparatus 300 itself, or through self-identification during a registration procedure undertaken by the user device. In some embodiments, the set of user device characteristics may further be implicitly scraped from clickstream data or contextual information regarding the user device. This clickstream data and contextual information may, for instance, be stored in a memory 302 (e.g., database 206 of the compatibility determination system 202).

Turning next to operation 404, the apparatus 300 includes means, such as personalization circuitry 310 or the like, for retrieving a set of data structure characteristics regarding the data structure. This set of data structure characteristics may be predefined by a developer device 212 during initial generation and/or registration of the data structure with the compatibility determination system 202. In some embodiments, however, this set of data structure characteristics may further be enriched automatically by the personalization circuitry 310 using clickstream data, contextual information, and/or automated analysis of historical records stored by the apparatus 300 (e.g., in database 206).

Turning next to operation 406, the apparatus 300 includes means, such as personalization circuitry 310 or the like, for calculating a set of characteristic-level compatibility scores. In this regard, this operation may comprise calculating characteristic-level compatibility scores for every unique combination of user device characteristic and data structure characteristic (in which case generation of a compatibility score for the data structure and user device combination uses only those characteristic-level compatibility scores relevant to characteristics of the user device and data structure in question). Alternatively, the characteristic-level compatibility score is calculated in this operation only for each unique combination of user device characteristics and data structure characteristic that are relevant to the user device and data structure in question (in which case generation of the compatibility score can utilize all of the calculated characteristic-level compatibility scores, as they will all be relevant).

In some embodiments, calculating each particular characteristic-level compatibility score comprises calculating a modified jaccard similarity score using a particular user device characteristic and a particular data structure characteristic. In some such embodiments, this modified jaccard similarity score may be generated using equation (1), described above. And in some such embodiments, this procedure may include applying a normalization process to the calculated modified jaccard similarity score, such as that outlined in equations (2), (3), and (4) above. Regardless of which specific methodology is used, though, the personalization circuitry may calculate the set of characteristic-level compatibility scores on-the-fly or may perform them in a batch process (in which case that may be performed periodically or on an ad hoc basis).

Turning next to operation 408, the apparatus 300 includes means, such as personalization circuitry 310 or the like, for generating, based on the set of characteristic-level compatibility scores, a compatibility score for the data structure and the user device. In this regard, generating the compatibility score based on the set of characteristic-level compatibility score may comprise determining the largest (e.g., the maximum) characteristic-level compatibility score of the set of characteristic-level compatibility scores, and generating the compatibility score with a value equal to the largest characteristic-level compatibility score. Alternatively, this operation may comprise determining an average of the set of characteristic-level compatibility scores; and generating the compatibility score with a value equal to the average of the set of characteristic-level compatibility scores.

Turning next to operation 410, the apparatus 300 includes means, such as aggregator 312 or the like, for generating, using the generated compatibility score, an indication of relative compatibility of the data structure for the user device. In this regard, this operation may include compiling a compatibility set comprising both the generated compatibility score for the data structure and the user device as well as one or more additional compatibility scores for the user device and corresponding additional data structures. The operation may further include ordering the compatibility set by compatibility score value, wherein ordered compatibility set (1) comprises the indication of relative compatibility of the data structure for the user device, and (2) indicates a ranking of the generated compatibility score for the data structure and the user device within the compatibility set.

Optionally, the procedure may advance to operation 412, in which the apparatus 300 includes means, such as communications circuitry 306 or the like, for causing transmission of a control signal to the user device based on the indication of relative compatibility. In some embodiments, the control signal identifies a selection set containing a predetermined number of data structures having a greatest indication of relative compatibility for the user device. For instance, FIG. 5 illustrates an example user interface 500 that may be presented to a user by a user device receiving the control signal. As shown in FIG. 5, elements 502A-502N illustrate corresponding data structures identified by the selection set. These elements further indicate that properties of the data structures may be presented alongside the indications of the data structures. These properties may comprise descriptive information (e.g., a name of the data structure, features provided from selection of the data structure, or the like), and may in some embodiments include an indication of the computed compatibility score for the data structure and the user device. The predetermined number of data structures illustrated in the user interface 500, in this regard, may be chosen by the compatibility determination system 202, in which case this predetermined number may be either static or variable. In an instance in which it is variable, the number may vary based on the compatibility score of the various data structures with regard to the user device, such that only those data structures having a compatibility score above a particular threshold (which, in turn, may be preselected) are provided. Alternatively, the predetermined number of data structures may be preselected by the user device receiving the control signal and based on the number of options the user of that user device may wish to see at any given time. In any event, as shown in FIG. 5, the user interface presented by the user device enables the user to select one or more of the illustrated data structures, or to indicate that the user wishes not to make a selection (element 504). Following selection, the user may select the "Submit" icon 506 to advance the procedure to operation 412.

In an instance in which operation 412 is performed, the procedure may optionally advance thereafter to operation 414, in which the apparatus 300 includes means, such as communications circuitry 306 or the like, for receiving, in response to transmission of the control signal, an indication of a data structure selected via the user device. It will be understood that in some embodiments, this indication may indicate selection of more than one data structure or may indicate that the user device has declined selection.

FIG. 4 thus illustrates a flowchart describing the operation of apparatuses, methods, and computer program products according to example embodiments contemplated herein. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus 300 and executed by a processor 302 of the apparatus 300. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and computer instructions.

Use Case: Daily Deal Sites

Having described example embodiments in general terms, the following example embodiments is provided to further illustrate one use case of some example embodiments.

Daily-deal sites collect the user preferences explicitly, through selections lists of other means. For example, users may indicate that they like "hair-cut" deals. Conversely, the deals are tagged with interest tags like "hair-cut". Accordingly, in this use case, a user's smart device may comprise a user device as used above, and the user preferences of the corresponding user may comprise the user device characteristics used to generate compatibility. Similarly, each distinct "deal" may comprise an individual data structure, and the interest tags assigned to each deal are then the data structure characteristics. Applied in this fashion, the above example embodiments will thus generate characteristic-level compatibility scores for each combination of one explicitly expressed user interest with one deal interest tag (which may in this embodiment be generated manually or by other means). In turn, these characteristic-level compatibility scores may be used individually or in combination with each other for generating compatibility scores for various deals for the particular user. These deals can thereafter be ranked using the compatibility scores and a predefined number can be provided for selection by the user (e.g., purchase, in this embodiment).

While in some circumstances, identifying relevant deals can be done in a straightforward method that matches the user with deals having the explicit deal interest they selected, this is only possible if the deal-interest tags are same as the user interest. For example, if the user has selected interest for "haircut" score haircut deals high for the user. But this easy method has several limitations. First, this method will not work if the user-interests are not same as deal-interest tags. For example a user-interest tag may be "grooming," but deals are tagged with "haircut." Second, this straightforward methodology would miss out on many deal types that the user has not chosen but would nevertheless likely be interested in based on his current set of interests. For, example users with an interest in haircut deals may also like deals with a "hair highlights" tag, even though the users may not have explicitly selected hair highlights as an interest. Third, some general interests like "foodie" are likely to be of less predictive value than more specific interests like "photo-printing." Many consumers select foodie, but do not demonstrate an increased propensity to buy restaurant deals, whereas some more specific interests like "photo-printing" are positively indicative of users who are likely to buy photo-printing deals.

Accordingly, by applying example embodiments to this use case, the compatibility determination system 202 is able to automatically identify relevant deals based on empirical data regarding user interests and deal tags that therefore adjusts for factors that would confound more simplistic relevance determination methods.

It should be understood from the above description of various example embodiments how this system would implement this use case in situations where a user has multiple interests and a deal has multiple tags. Some deals may match with more than one of user's interest. For example, a user might have the interests "foodie", "tea-time", and "boutique-hotel". It is not clear if this user is more interested in a deal having tags "tea-time" and "foodie" or another deal with "foodie" and "boutique-hotel". Accordingly, by utilizing characteristic-level compatibility scoring and either utilizing a largest characteristic-level compatibility score or an average of various characteristic-level compatibility scores, example embodiments facilitate the evaluation of situations where there are multiple user interests and/or multiple deal interest tags.

Finally, this use case presents problems surrounding big data analysis, because the scale of the problem is large enough to rule out any manual method of determining deal relevance on an individualized basis, thus demonstrating yet another reason to favor an algorithmic implementation to score user-deal pairs based on interests. In some embodiments of this use case, example embodiments may further utilize a model based on user clickstream data and contextual information, which may be stored as the user interacts with the daily deal app or website. In such embodiments, whenever compatibility of a deal needs to be scored for the user (e.g., at a time that the daily deal site intends to send an impression of a set of promotions to the user), the model can thus be used to score the deal-user pair based on updated user interest information gleaned not only from the user's self-identification of interests, but also on implicit interests identified based on the clickstream data and contextual information regarding the user. In other embodiments, the compatibility score may be combined with scores received from other methods of performing relevance scoring to derive a final relevance score for the deal-user pair.

CONCLUSION

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for automatically evaluating compatibility of a data structure with a user device, the apparatus comprising:
communications circuitry configured to receive a set of user device characteristics regarding the user device;
personalization circuitry configured to
retrieve a set of data structure characteristics regarding the data structure,
calculate a set of characteristic-level compatibility scores by calculating a characteristic-level compatibility score for each combination pair of one user device characteristic from the set of user device characteristics and one data structure characteristic from the set of data structure characteristics by calculating a modified jaccard similarity score for each combination pair,
generate, based on the set of characteristic-level compatibility scores, a compatibility score for the data structure and the user device; and
an aggregator configured to generate, using the generated compatibility score, an indication of relative compatibility of the data structure for the user device,
wherein the communications circuitry is further configured to cause transmission of a control signal to the user device based on the indication of relative compatibility.

2. The apparatus of claim 1, wherein the personalization circuitry is further configured to calculate each characteristic-level compatibility score by:
applying a normalization algorithm to each of the calculated modified jaccard similarity scores.

3. The apparatus of claim 1, wherein the personalization circuitry is configured to generate the compatibility score based on the set of characteristic-level compatibility scores by:
determining a largest characteristic-level compatibility score of the set of characteristic-level compatibility scores; and
generating the compatibility score with a value equal to the largest characteristic-level compatibility score.

4. The apparatus of claim 1, wherein the personalization circuitry is configured to generate the compatibility score based on the set of characteristic-level compatibility scores by:
determining an average of the set of characteristic-level compatibility scores; and
generating the compatibility score with a value equal to the average of the set of characteristic-level compatibility scores.

5. The apparatus of claim 1, wherein the aggregator is configured to generate the indication of relative compatibility of the data structure for the user device by:
compiling a compatibility set comprising both the generated compatibility score for the data structure and the user device and a plurality of characteristic-level compatibility scores for the user device and a plurality of corresponding data structures; and
ordering the compatibility set by compatibility score value,
wherein ordered compatibility set (1) comprises the indication of relative compatibility of the data structure for the user device, and (2) indicates a ranking of the generated compatibility scores for the data structures and the user device within the compatibility set.

6. The apparatus of claim 1, wherein the control signal identifies a selection set containing a predetermined number of data structures having a greatest indication of relative compatibility for the user device.

7. A method for automatically evaluating compatibility of a data structure with a user device, the method comprising:
receiving, by communications circuitry, a set of user device characteristics regarding the user device;
retrieving, by personalization circuitry, a set of data structure characteristics regarding the data structure;
calculating, by the personalization circuitry, a characteristic-level compatibility score for each combination pair of one user device characteristic from the set of user device characteristics and one data structure characteristic from the set of data structure characteristics by calculating a modified jaccard similarity score for each combination pair;
generating, by the personalization circuitry and based on the set of characteristic-level compatibility scores, a compatibility score for the data structure and the user device;
generating, by an aggregator and using the generated compatibility score, an indication of relative compatibility of the data structure for the user device; and
causing, by communications circuitry, transmission of a control signal to the user device based on the indication of relative compatibility.

8. The method of claim 7, wherein calculating each characteristic-level compatibility score further comprises:
applying, by the personalization circuitry, a normalization algorithm to each of the calculated modified jaccard similarity scores.

9. The method of claim 7, wherein generating the compatibility score based on the set of characteristic-level compatibility scores comprises:
determining, by the personalization circuitry, a largest characteristic-level compatibility score of the set of characteristic-level compatibility scores; and
generating, by the personalization circuitry, the compatibility score with a value equal to the largest characteristic-level compatibility score.

10. The method of claim 7, wherein generating the compatibility score based on the set of characteristic-level compatibility scores comprises:
determining, by the personalization circuitry, an average of the set of characteristic-level compatibility scores; and
generating, by the personalization circuitry, the compatibility score with a value equal to the average of the set of characteristic-level compatibility scores.

11. The method of claim 7, wherein generating the indication of relative compatibility of the data structure for the user device includes:
compiling, by the aggregator, a compatibility set comprising both the generated compatibility score for the data structure and the user device and one or more additional characteristic-level compatibility scores for the user device and a plurality of additional data structures; and
ordering, by the aggregator, the compatibility set by compatibility score value,
wherein ordered compatibility set (1) comprises the indication of relative compatibility of the data structure for the user device, and (2) indicates a ranking of the generated compatibility score for the data structures and the user device within the compatibility set.

12. The method of claim 7, wherein the control signal identifies a selection set containing a predetermined number of data structures having a greatest indication of relative compatibility for the user device.

13. The method of claim 12, further comprising:
receiving, by the communications circuitry and in response to transmission of the control signal, an indication of a data structure selected from the selection set.

14. A computer program product for automatically evaluating compatibility of a data structure with a user device, the computer program product comprising at least one non-transitory computer-readable storage medium storing program instructions that, when executed, cause an apparatus to:
receive a set of user device characteristics regarding the user device;
retrieve a set of data structure characteristics regarding the data structure;
calculate a set of characteristic-level compatibility scores based on each combination pair of one user device characteristic from the set of user device characteristics and one data structure characteristic from the set of data structure characteristics by calculating a modified jaccard similarity score for each combination pair;
generate, based on the set of characteristic-level compatibility scores, a compatibility score for the data structure and the user device;
generate, using the generated compatibility score, an indication of relative compatibility of the data structure for the user device; and cause transmission of a control signal to the user device based on the indication of relative compatibility.

15. The computer program product of claim 14, wherein the apparatus is further configured to calculate each characteristic-level compatibility score by:
applying a normalization algorithm to each of the calculated modified jaccard similarity scores.

16. The computer program product of claim 14, wherein the apparatus is configured to generate the compatibility score based on the set of characteristic-level compatibility scores by:
determining a largest characteristic-level compatibility score of the set of characteristic-level compatibility scores; and
generating the compatibility score with a value equal to the largest characteristic-level compatibility score.

17. The computer program product of claim 14, wherein the apparatus is configured to generate the compatibility score based on the set of characteristic-level compatibility scores by:
determining an average of the set of characteristic-level compatibility scores; and
generating the compatibility score with a value equal to the average of the set of characteristic-level compatibility scores.

18. The computer program product of claim 14, wherein the apparatus is configured to generate the indication of relative compatibility of the data structure for the user device by:
compiling a compatibility set comprising both the generated compatibility score for the data structure and the user device and the compatibility scores for the user device and a plurality of additional data structures; and
ordering the compatibility set by compatibility score value,
wherein ordered compatibility set (1) comprises the indication of relative compatibility of the data structure for the user device, and (2) indicates a ranking of the generated compatibility scores for the data structures and the user device within the compatibility set.

19. The computer program product of claim 14, wherein the control signal identifies a selection set containing a predetermined number of data structures having a greatest indication of relative compatibility for the user device.

20. The computer program product of claim 19, wherein the apparatus is further configured to:
receive, in response to transmission of the control signal, an indication of a data structure selected from the selection set.

* * * * *